United States Patent
Cheikh et al.

(10) Patent No.: US 10,027,375 B2
(45) Date of Patent: Jul. 17, 2018

(54) DEVICE FOR NEAR-FIELD RADIOFREQUENCY COMMUNICATION WITH A PORTABLE ELEMENT ON BOARD A MOTOR VEHICLE

(71) Applicants: CONTINENTAL AUTOMOTIVE FRANCE, Toulouse (FR); CONTINENTAL AUTOMOTIVE GMBH, Hannover, DE (US)

(72) Inventors: Mohamed Cheikh, Toulouse (FR); Guillaume Vigneau, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/327,059

(22) PCT Filed: Jul. 23, 2015

(86) PCT No.: PCT/EP2015/001516
§ 371 (c)(1),
(2) Date: Jan. 18, 2017

(87) PCT Pub. No.: WO2016/015848
PCT Pub. Date: Feb. 4, 2016

(65) Prior Publication Data
US 2017/0170875 A1    Jun. 15, 2017

(30) Foreign Application Priority Data

Jul. 31, 2014  (FR) ..................... 14 57424

(51) Int. Cl.
*H04B 5/00* (2006.01)
*H04B 7/145* (2006.01)
(Continued)

(52) U.S. Cl.
CPC ......... *H04B 5/0031* (2013.01); *H04B 5/0081* (2013.01); *H04B 7/145* (2013.01); *H04W 4/008* (2013.01); *H04W 4/80* (2018.02)

(58) Field of Classification Search
CPC .. H04B 5/0031; H04B 5/0025; H04B 5/0081; H04B 7/00; H04B 7/145; H04W 4/008
(Continued)

(56) References Cited

U.S. PATENT DOCUMENTS 8,288,893 B2    10/2012   Cook et al.
2011/0234370 A1  9/2011  Briese et al.
(Continued)

OTHER PUBLICATIONS

International Search Report, dated Sep. 14, 2015, from corresponding PCT application.

*Primary Examiner* — Sonny Trinh
(74) *Attorney, Agent, or Firm* — Young & Thompson

(57) ABSTRACT

Disclosed is a device (D') for near-field radiofrequency communication with a portable element, the device including: at least one near-field communication primary antenna (A0) having a predetermined communication frequency (Fc); and a microcontroller (30') electrically connected to the primary antenna, including a power supply source for the primary antenna and a receiver unit for the data (20') received by the primary antenna. The communication device further includes: at least one passive relay antenna (A1 . . . A8), juxtaposed with the primary antenna, relay frequencies (F1 . . . F8), lying within a range of values around the predetermined communication frequency (Fc), but different from the predetermined communication frequency (Fc), electrically connected to the data receiver unit. Also included is a unit (C4) for adjusting the relay frequency. The communication device can be used to enlarge the near-field communication surface of the communication device.

20 Claims, 4 Drawing Sheets

(51) Int. Cl.
*H04W 4/00* (2018.01)
*H04W 4/80* (2018.01)

(58) Field of Classification Search
USPC ................................................ 455/41.1, 41.3
See application file for complete search history.

(56) References Cited

U.S. PATENT DOCUMENTS

| | | |
|---|---|---|
| 2012/0249396 A1 | 10/2012 | Parsche |
| 2013/0057079 A1* | 3/2013 | Park ......................... H02J 7/00 307/104 |
| 2013/0093387 A1* | 4/2013 | Vassilieff ................ H01F 38/14 320/108 |
| 2013/0244577 A1* | 9/2013 | Cheikh .............. G07C 9/00309 455/41.1 |
| 2016/0292560 A1* | 10/2016 | Ayatollahi ......... G06K 19/0726 |

* cited by examiner

DEVICE FOR NEAR-FIELD RADIOFREQUENCY COMMUNICATION WITH A PORTABLE ELEMENT ON BOARD A MOTOR VEHICLE

BACKGROUND OF THE INVENTION

Field of the Invention

The invention relates to a device for near-field radiofrequency communication device with a portable element on board a motor vehicle The expression "near-field radiofrequency communication" (or NFC, for "Near-Field Communication") is taken to mean communication at a frequency of about 13.56 MHz.

Description of the Related Art

Increasing numbers of motor vehicles are now equipped with NFC technology. This NFC technology allows communication over a short range, and therefore in a secure way, using for example a hands-free access badge or a mobile phone. When integrated into a hands-free access system, it enables said badge or phone to be identified as being matched to the vehicle. Following this authentication, the openable body sections of the vehicle are automatically unlocked without any manual action by the user on the door. It may also be integrated into an inductive charging device on board the vehicle. In this case, when the mobile phone is placed on the charging surface of the inductive charging device and is charged, communication can be established between said phone and the electronic system of the vehicle. This communication can be used to download audio files, for example, to the multimedia system of the vehicle, and for other purposes.

An NFC device takes the form of a flat NFC antenna associated with an electronic transmission and reception circuit.

The quality and effectiveness of data communication between this NFC antenna (called the primary antenna) and the NFC antenna integrated into the portable element (called the secondary antenna) depend mainly on:
- the positions of the two antennas relative to one another; the optimal position for effective communication is one in which the two antennas (primary and secondary) are centered relative to one another and parallel, providing maximum coupling,
- the sizes of the antennas relative to one another, the most effective NFC being obtained when the two antennas (primary and secondary) are substantially identical in size.

The size of the secondary antenna varies according to the type of portable element, which may be a hands-free access badge, a mobile phone, or other device.

Additionally, within the same type of portable element, for example a mobile phone, the size of the secondary antenna may also vary considerably from one phone to another. It is therefore difficult to achieve maximum NFC quality and effectiveness across the whole range of portable elements, that is to say the whole range of types of secondary antennas.

A prior art NFC device D is illustrated in FIG. 1. A primary antenna A0 is positioned in a support 10, for example an inductive charging device or an NFC reader for hands-free access to the vehicle.

The primary antenna A0 is centered in the center 0 of the device, and is electrically connected to an electronic NFC data transmission and reception circuit 20, which is itself electrically connected to an electronic control unit 0 on board the vehicle, for example a BCM (or "Body Control Module" in English), or to a microcontroller 30.

FIG. 2 shows the near-field communication electromagnetic field B extending from said primary antenna A0 along the axis Z, which is the axis perpendicular to the support 10, and along the longitudinal axis X (or the transverse axis Y) of the support 10 and over a half length $\frac{1}{2} L_s$ of said support 10.

Clearly, the maximum intensity of the electromagnetic field B is available in the center 0 of the primary antenna, and the intensity of the electromagnetic field B decreases with increasing distance from the center 0 of the primary antenna A0.

Thus, when a portable element (not shown in FIG. 1) is placed on the support 10, it receives optimal near-field communication only if the secondary antenna, present in the portable element, is centered on the primary antenna A0, that is to say where the magnetic field B has its maximum intensity. If the secondary antenna is off-center relative to the primary antenna A0 (that is to say, relative to the center 0), or if, for example, it is larger than said primary antenna A0, the quality and effectiveness of the NFC are degraded. The near-field communication area is therefore restricted.

To overcome this problem, there is a prior art method of arranging a plurality of adjustable primary antennas in the communication device D, each antenna being connected to one or more switches. When the portable element is placed on the charging surface of the support 10, only the primary antenna A0 aligned most closely with the secondary antenna is activated, by means of a switch associated with the support. These adjustable primary antennas A0 also comprise means for adjusting their size, such as means for selecting an exact number of turns of copper wire in the coil forming each antenna. These adjustment means can be used to adapt the size of the primary antenna according to the size of the secondary antenna. Thus, by using switches and size adjustment means (which may be other switches), the position and size of the primary antenna may be adapted to provide optimal effectiveness and quality of communication with the secondary antenna of the portable element, and the near-field communication area is enlarged.

However, this prior art solution is very costly, since it requires a plurality of active primary antennas (that is to say, antennas supplied with current) and a plurality of switches.

BRIEF SUMMARY OF THE INVENTION

The invention proposes a device for near-field communication with a portable element, which is inexpensive and provides optimal quality and effectiveness of NFC with a secondary antenna, regardless of the size of said secondary antenna and regardless of its position relative to the primary antenna.

The invention proposes a device for near-field radiofrequency communication with a portable element, said device comprising:
- at least one near-field communication primary antenna having a predetermined communication frequency,
- a microcontroller electrically connected to said primary antenna, comprising a power supply source for said primary antenna and a receiver unit for the data received by said primary antenna, the invention proposing a communication device which further comprises:

at least one passive relay antenna which:
  juxtaposed with said primary antenna,
    has a relay frequency within a range of values around the predetermined communication frequency, but different from the communication frequency,
    electrically connected to the data receiver unit, and
  has means for adjusting the relay frequency.

Thus the passive relay antenna can be used to recover part of the electromagnetic field emitted by the primary antenna and then to generate an electromagnetic field directed toward the portable element.

The passive relay antenna is less expensive, since it is not supplied with power and needs no switches or control means for such switches. In the present case, the antenna is a coil of copper wire windings.

In a preferred embodiment, the dimensions of at least one passive relay antenna are substantially identical to those of the primary antenna, In a second embodiment, the communication device comprises a plurality of passive relay antennas juxtaposed around the primary antenna. The relay frequencies of the passive relay antennas differ from one another.

It is advisable for at least one of the passive relay antennas to be electrically connected to the data receiver unit via the primary antenna.

Advantageously, said communication device comprises an even number of passive relay antennas, and
  the primary antenna defines a center and is passed through by a longitudinal axis and a transverse axis intersecting at said center, and
  the passive relay antennas are distributed around the primary antenna symmetrically relative to said two axes, and
  the relay frequencies are assigned to said relay antennas symmetrically relative to said two axes.

Preferably, the values of the relay frequencies are between −10% and +10% of the communication frequency.

The device comprises a communication surface, and the total surface of the primary antenna and the at least one passive relay antenna is at least substantially equal to the communication surface.

The invention also relates to any door handle of a motor vehicle comprising a communication device according to any of the aforementioned characteristics, as well as any inductive charging device on board a motor vehicle comprising a communication device according to any of the aforementioned characteristics.

Finally, the invention can be applied to any motor vehicle comprising a communication device according to any of the aforementioned characteristics.

BRIEF DESCRIPTION OF THE DRAWINGS

Other characteristics and advantages of the invention will be apparent from a reading of the following description and from a perusal of the appended drawings, in which.

DETAILED DESCRIPTION OF THE PREFERRED EMBODIMENTS

Figure 1:
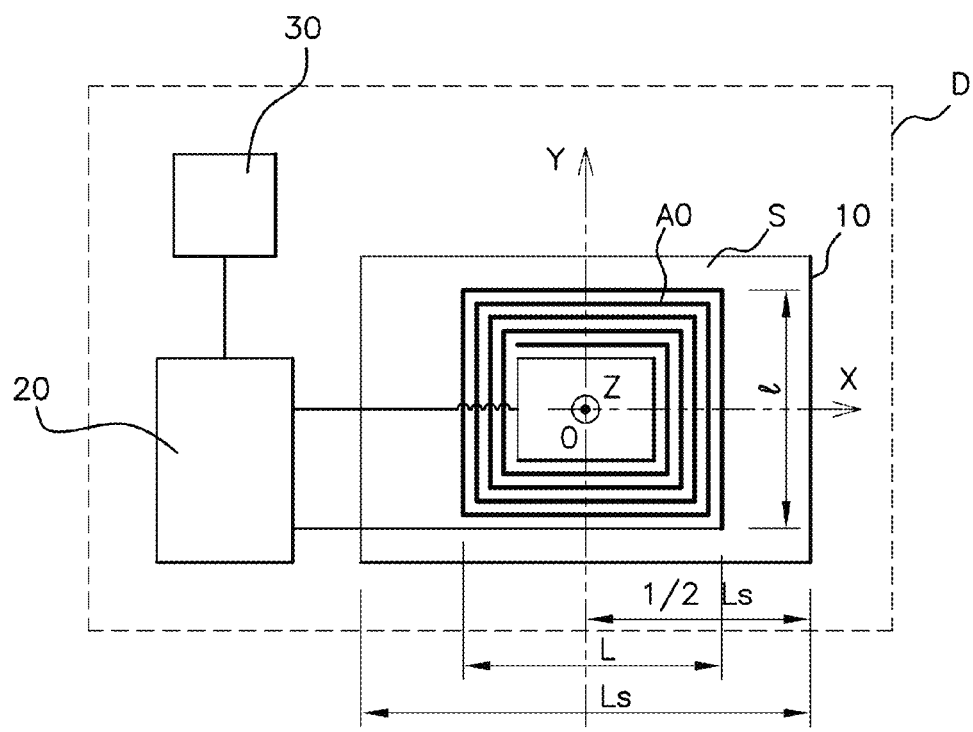
FIG. 1 is a schematic top view of the near-field communication device D according to the prior art.
Figure 2:
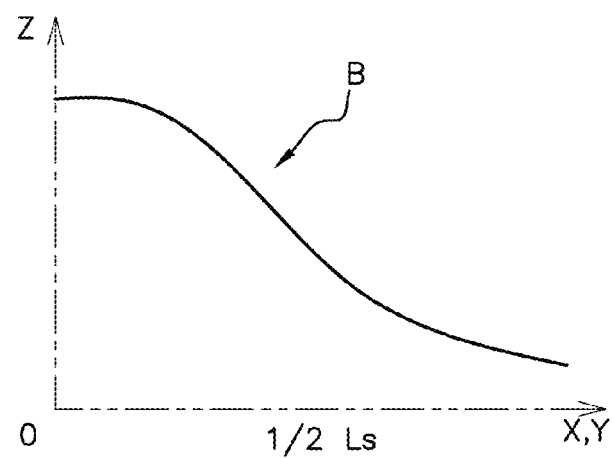
FIG. 2 shows, according to the prior art, the near-field communication field on a half-surface of the device of FIG. 1, along the axis Z.
Figure 3:
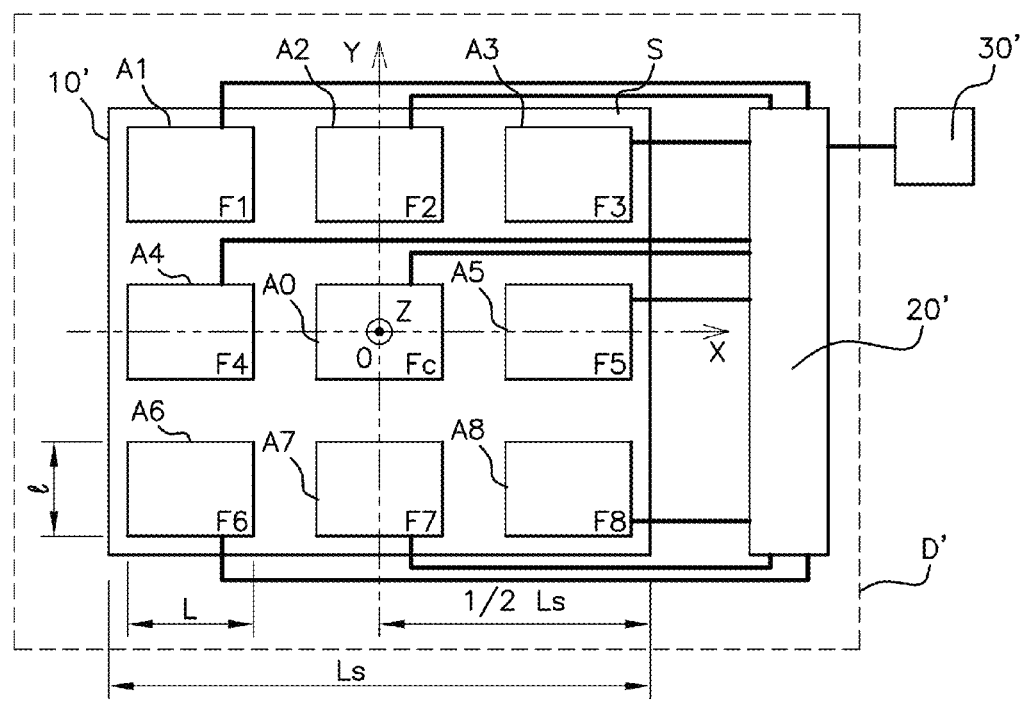
FIG. 3 is a schematic top view of a first embodiment of the near-field communication device D' according to the invention.
Figure 4:
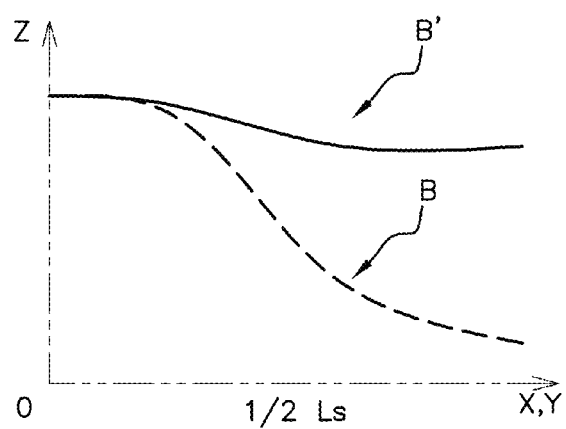
FIG. 4 shows, according to the invention, the near-field communication field on a half-surface of the device of FIG. 3, along the axis Z.

The invention proposes a near-field radiofrequency communication device D' as shown in FIG. 3. The communication device D' has a rectangular communication surface S.

The communication device D' comprises a primary antenna A0, of the near-field radiofrequency communication antenna type, with a center 0 through which there pass a longitudinal axis X and a transverse axis Y, intersecting at the center 0. The primary antenna A0 has a length L along the longitudinal axis and a width I along the transverse axis Y.

At least one passive relay antenna is juxtaposed with the primary antenna A0. For the purposes of explanation only, FIG. 3 shows a plurality of passive relay antennas A1, A2, A3, A4, A5, A6, A7, A8 juxtaposed with the primary antenna A0.

Each passive relay antenna A1 . . . A8 is connected to an electronic NFC data transmission and reception circuit 20', which is itself electrically connected to an electronic control unit on board the vehicle, for example a BCM (or "Body Control Module" in English), or to a microcontroller 30'. The passive relay antennas A1 . . . A8 may be connected directly to the electronic NFC data transmission and reception circuit 20' (as shown in FIG. 3), or may be connected indirectly to the electronic NFC data transmission and reception circuit 20' via the primary antenna A0, which is itself electrically connected to the electronic NFC data transmission and reception circuit 20'; in the latter case, the passive relay antennas A1 . . . A8 are connected to the primary antenna A0, which is itself connected to the electronic NFC data transmission and reception circuit 20'.

The primary antenna A0 may be identical to that used in the prior art. It is powered by the electronic NFC data transmission and reception circuit 20', and emits an electromagnetic field B0 at a communication frequency Fc of about 13.56 MHz.

Passive relay antennas A1, A2, A3, A4, A5, A6, A7, A8 are juxtaposed on each side of said primary antenna A0 (see FIG. 3). The term "juxtaposed" is taken to mean that the primary antenna A0 is surrounded by passive relay antennas A1, A2, A3, A4, A5, A6, A7, A8, which are all juxtaposed with one another as well as being juxtaposed with said primary antenna A0.

In a preferred embodiment of the invention, each passive relay antenna A1, A2, A3, A4, A5, A6, A7, A8 has dimensions substantially identical to the dimensions of the primary antenna A0, that is to say a length L and a width I. However, according to the invention, the passive relay antennas A1 . . . A8 may also have different dimensions from those of the primary antenna A0.

In the embodiment shown in FIG. 3, the primary antenna A0 has a square shape, but it may also have another shape such as round, rectangular or hexagonal.

Figure 7:
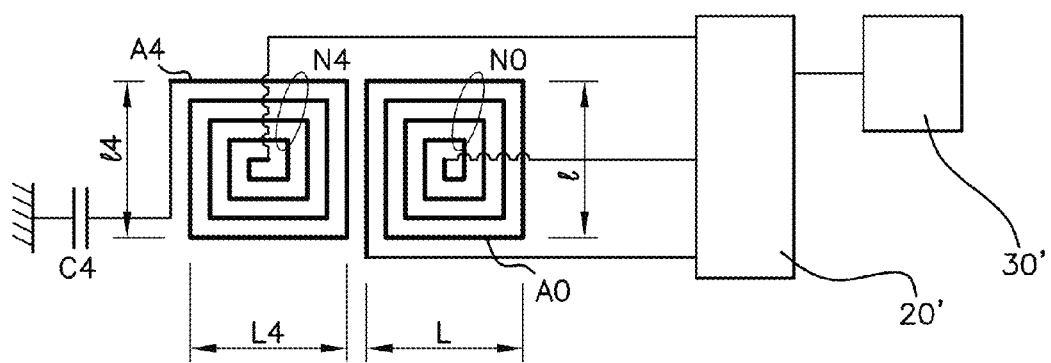
FIG. 7 is a schematic view of a passive relay antenna A4 of the communication device D' according to the invention.

For purely explanatory purposes, FIG. 7 shows a single passive relay antenna A4 of rectangular shape, whose width I4 and length L4 are identical to the width I and length L, respectively, of the primary antenna A0. The passive relay antenna A4 is composed of a coil comprising a number of copper wire windings N4 identical to the number of copper wire windings N0 of the primary antenna A0.

Figure 6:
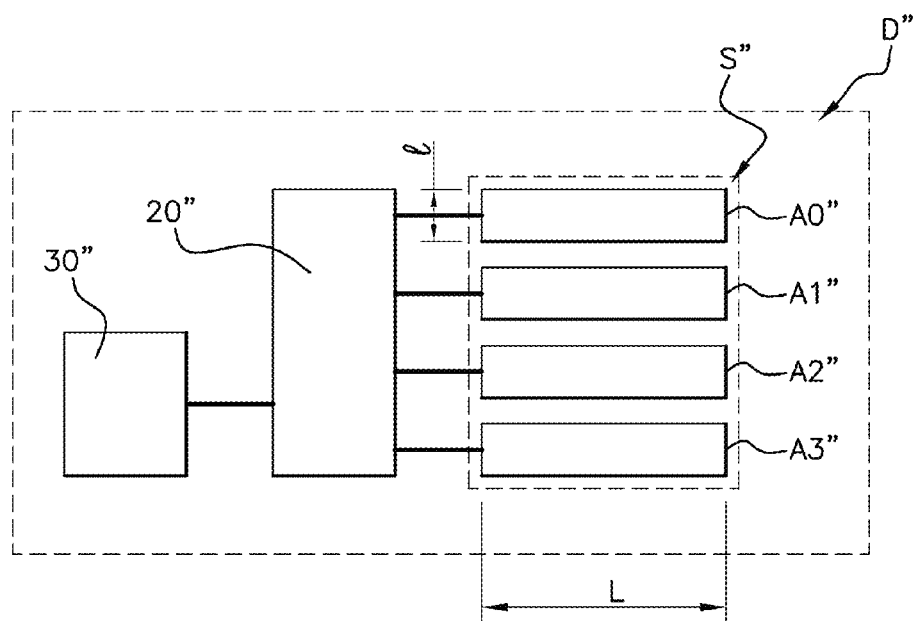
FIG. 6 is a schematic view of a second embodiment of the communication device D" according to the invention.

In a second embodiment shown in FIG. 6, the primary antenna A0" is rectangular. The passive relay antennas A1", A2" and A3" are also rectangular (and have identical dimensions), and are juxtaposed with only one side of said primary antenna A0.

Preferably, the total surface area occupied by the primary antenna A0 (or A0", respectively) and the passive relay antennas A1, A2, A3, A4, A5, A6, A7, A8 (or A1", A2", A3", respectively) is at least substantially equal to the communication surface S (or S", respectively) of the communication device D' (D").

Said relay antennas A1 . . . A8 are called "passive" because they are not powered via the electronic NFC data transmission/reception circuit 20'. They each consist of a coil of copper wire windings, and they are not connected to a power supply source, unlike the primary antenna A0, which is connected to a power supply source via the electronic NFC data transmission/reception circuit 20'.

The communication device D' also comprises, for each passive relay antenna A1, A2, A3, A4, A5, A6, A7, A8, frequency adjustment means for the purpose of adjusting a frequency of each passive relay antenna, called the relay frequency F1, F2, F3, F4, F5, F6, F7, F8 (see FIG. 3), to a value lying within a range of values around the communication frequency Fc of 13.56 MHz, but different from said communication frequency Fc. For example, the relay frequencies F1 . . . F8 of the passive relay antennas may be equal to 13.9 MHz, 14.5 MHz, and 14.7 MHz. Preferably, the values of the relay frequencies F1 . . . F8 lie within a range of values equal to the communication frequency Fc plus or minus 10%, that is to say between 12 MHz and 15 MHz. In one embodiment, the relay frequencies F1 . . . F8 are all different from one another.

These frequency adjustment means may, for example, comprise capacitors electrically connected to each coil of the passive relay antennas A1 . . . A8 (for example, the capacitor C4 connected to the passive relay antenna A4 in FIG. 7). These means of adjusting the relay frequencies F1 . . . F8 are well known to those skilled in the art, and will not be detailed here.

In a preferred embodiment, said communication device D' comprises an even number of passive relay antennas A1 . . . A8, and the passive relay antennas A1 . . . A8 are distributed symmetrically around the primary antenna A0 relative to the longitudinal axis X and the transverse axis Y (see FIG. 3), while the relay frequencies F1 . . . F8 are assigned to said passive relay antennas A1 . . . A8 symmetrically relative to said two axes X, Y; more precisely, as shown in FIG. 3, F1=F3=F6=F8 and F2=F7 and F4=F5.

Clearly, the communication device D' may comprise an odd number of passive relay antennas A1 . . . Ai, distributed around the primary antenna A0. In this case, it is difficult to ensure the symmetry of the values of the relay frequencies F1 . . . Fi relative to the two axes X, Y; consequently, the magnetic field at the communication surface S of the communication device D' will not be symmetrical relative to the two axes X, Y or uniform above the communication surface S.

It is therefore preferable to use an even number of passive relay antennas A1 . . . A8.

Figure 5:
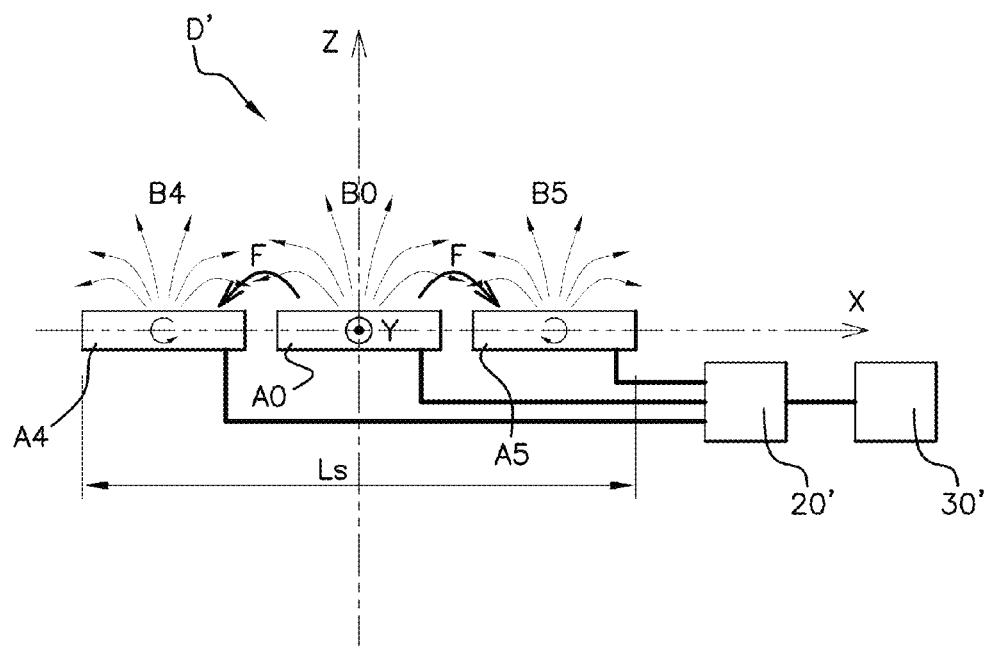
FIG. 5 is a schematic side view of the communication device according to FIG. 3.

The essence of the invention is that a portion, equal to about 20%, of the electromagnetic field flux B0 emitted by the primary antenna A0 is dissipated on either side of said antenna, and therefore cannot be used for the inductive charging of the portable element (not shown). Usefully, the invention proposes that this portion of the flux F (see FIG. 5) of the electromagnetic field B0 be recycled, by placing passive relay antennas A1 . . . A8 on either side of the primary antenna A0. For the purposes of explanation, FIG. 5 shows only two passive relay antennas, A4 and A5, located on either side along the longitudinal axis X of the primary antenna A0.

The passive relay antennas A4, A5 each receive this portion of flux F (approximately 20%, for example) of the electromagnetic field B0. The flux F received in this way generates an electric current in each coil of the passive relay antennas A4, A5; in turn, this current generates an electromagnetic field B4, B5 in each of said passive relay antennas A4, A5. These electromagnetic fields B4, B5 are oriented in the same direction as the electromagnetic field B0 of the primary antenna A0, that is to say directed toward the portable element, and have an intensity less than or equal to that of the electromagnetic field B0 of the primary antenna A0.

Thus, if $$F=0.2 \times B0,$$

then $$B4=B5 \leq B0,$$

where:

F is the portion of lost flux created by the electromagnetic field B0 produced by the primary antenna A0, B4 is the electromagnetic field produced by the passive relay antenna A4, and B5 is the electromagnetic field produced by the passive relay antenna A5.

In fact, since the relay frequencies F1 . . . F8 of the relay antennas A1 . . . A8, are substantially equal to the communication frequency Fc of the primary antenna A0, said passive relay antennas A1 . . . A8 are resonant for NFC. By adapting them to obtain an optimal quality factor (by adding a resistor or modifying the thickness of the copper wire of their component coils, for example), the passive relay antennas A1 . . . A8 are made to operate as electromagnetic field amplifiers. Said passive relay antennas A1 . . . A8 receive the lost flux portion F of the electromagnetic field B0 of the primary antenna A0 and amplify it, then emit an amplified electromagnetic field B4, B5, whose value is equal to or a little less than the value of the electromagnetic field B0 of the primary antenna A0 (for example 80%×B0).

To ensure that the electromagnetic fields B4, B5 produced by the passive relay antennas A4, A5 have substantially the same value as the electromagnetic field B0 of the primary antenna A0, the dimensions of the passive relay antennas A4, A4 are preferably substantially identical to those of the primary antenna A0. This provides a uniform electromagnetic field above the communication surface S.

It is also important for the relay frequencies F1 . . . F8 of the passive relay antennas A1 . . . A8 not to be strictly equal to the communication frequency Fc (13.56 MHz) of the primary antenna A0. This is because, if the values of the relay frequencies F1 . . . F8 are equal to the communication frequency Fc of the primary antenna A0, the passive relay antennas A1 . . . A8 will be electromagnetically coupled to the primary antenna A0, causing the primary antenna A0 to be mismatched, that is to say causing its communication frequency Fc to be shifted far away from the value of 13.56 MHz, thus adversely affecting its operation. The communication effectiveness and quality of said primary antenna A0 are then degraded. When the relay frequencies F1 . . . F8 are slightly offset around the communication frequency Fc of the primary antenna A0, the passive relay antennas A1 ... A8 still emit in the near-field communication frequency band (around 13.56 MHz), but do not perturb the operation of the primary antenna A0, which continues to be the main communication antenna of the communication device D'.

Thus, because of the presence of the passive relay antennas A1 ... A8, it is possible to recycle the portion of flux F of the electromagnetic field B0 of the primary antenna A0 which was lost in the prior art, so as to generate other electromagnetic fields on the communication surface S of the communication device D'. These electromagnetic fields can be used to communicate with the portable element placed on the communication device D', even if this element is not aligned with the primary antenna A0.

The surface on which the communication device D' communicates with the portable element is therefore enlarged, according to the invention, relative to that of the prior art.

According to the invention, the portable element may be placed on the communication device D' regardless of the position of the primary antenna A0, while providing optimal communication, in terms of effectiveness and quality, between the communication device D' and the portable element.

Clearly, the invention is not limited to the embodiments described above. Different geometries of the primary antenna (and therefore of the passive relay antennas) may be used. The passive relay antennas may, for example, form a row located on only one side of the primary antenna (see FIG. 6). The invention is not limited to near-field communication at 13.56 MHz, but covers any high-frequency radio communication, being equally applicable, for example, to an inductive charging antenna of the A 4WP type (an abbreviation for "Alliance for Wireless Power") having a charging frequency of 6 MHz.

The invention claimed is:

1. A device for near-field radiofrequency communication with a portable element, said device comprising:
   at least one near-field communication primary antenna having a predetermined communication frequency;
   a microcontroller electrically connected to said primary antenna, the microcontroller comprising a power supply source for said primary antenna and a receiver unit for the data received by said primary antenna;
   at least two passive relay antennas each having dimensions substantially identical to the dimensions of the primary antenna, the passive relay antennas
      being located on either side of the primary antenna and juxtaposed with said primary antenna,
      having relay frequencies that are each lying within a range of values around the predetermined communication frequency, but different from the predetermined communication frequency, and
      being electrically connected to the data receiver unit; and
   a frequency adjuster configured to adjust the relay frequency.

2. The communication device as claimed in claim 1, wherein the at least two passive relay antennas include a plurality of passive relay antennas juxtaposed around the primary antenna.

3. The communication device (D') as claimed in claim 2, wherein the relay frequencies of the passive relay antennas differ from one another.

4. The communication device (D') as claimed in claim 3, wherein at least one passive relay antenna of the at least two passive relay antennas is electrically connected to the data receiver unit via the primary antenna.

5. The communication device (D') as claimed in claim 3, wherein:
   said communication device comprises an even number of the passive relay antennas (A1 ... A8), and
   the primary antenna has a center, and is passed through by a longitudinal axis and a transverse axis, intersecting at said center, and
   the passive relay antennas are distributed around the primary antenna symmetrically relative to said two axes, and
   the relay frequencies are assigned to said relay antennas symmetrically relative to said two axes.

6. The communication device as claimed in claim 3, wherein the values of the relay frequencies are between −10% and +10% of the communication frequency.

7. The communication device as claimed in claim 3, further comprising a communication surface,
   wherein the total surface of the primary antenna and at least one of the passive relay antennas is at least substantially equal to the communication surface.

8. The communication device as claimed in claim 2, wherein:
   said communication device comprises an even number of the passive relay antennas (A1 ... A8), and
   the primary antenna has a center, and is passed through by a longitudinal axis and a transverse axis, intersecting at said center, and
   the passive relay antennas are distributed around the primary antenna symmetrically relative to said two axes, and
   the relay frequencies are assigned to said relay antennas symmetrically relative to said two axes.

9. The communication device as claimed in claim 8, wherein the values of the relay frequencies are between −10% and +10% of the communication frequency.

10. The communication device (D') as claimed in claim 2, wherein at least one passive relay antenna of the at least two passive relay antennas is electrically connected to the data receiver unit via the primary antenna.

11. The communication device as claimed in claim 2, wherein the values of the relay frequencies are between −10% and +10% of the communication frequency.

12. The communication device as claimed in claim 2, further comprising a communication surface,
   wherein the total surface of the primary antenna and at least one of the passive relay antennas is at least substantially equal to the communication surface.

13. The communication device as claimed in claim 1, wherein at least one passive relay antenna of the at least two passive relay antennas is electrically connected to the data receiver unit via the primary antenna.

14. The communication device (D') as claimed in claim 13, wherein:
   said communication device comprises an even number of the passive relay antennas (A1 ... A8), and
   the primary antenna has a center, and is passed through by a longitudinal axis and a transverse axis, intersecting at said center, and
   the passive relay antennas are distributed around the primary antenna symmetrically relative to said two axes, and
   the relay frequencies are assigned to said relay antennas symmetrically relative to said two axes.

15. The communication device as claimed in claim 13, wherein the values of the relay frequencies are between −10% and +10% of the communication frequency.

16. The communication device as claimed in claim 1, wherein the values of the relay frequencies are between −10% and +10% of the communication frequency.

17. The communication device as claimed in claim 1, further comprising a communication surface,
   wherein the total surface of the primary antenna and at least one of the passive relay antennas is at least substantially equal to the communication surface.

18. A door handle of a motor vehicle comprising:
   the communication device as claimed in claim 1.

19. An inductive charging device on board a motor vehicle comprising the communication device as claimed in claim 1.

20. A motor vehicle comprising:
   the communication device as claimed in claim 1.

* * * * *